United States Patent [19]

Akaba

[11] Patent Number: 5,334,984

[45] Date of Patent: Aug. 2, 1994

[54] METHOD AND SYSTEM FOR LOCATING DIRECTION OF TRANSMISSION SOURCE BASED ON WAVE THEREFROM

[75] Inventor: Noriyuki Akaba, Yokohama, Japan

[73] Assignee: Tokyo Keiki Co., Ltd., Tokyo, Japan

[21] Appl. No.: 920,513

[22] Filed: Jul. 28, 1992

Related U.S. Application Data

[63] Continuation of Ser. No. 531,678, Jun. 1, 1990, abandoned.

[30] Foreign Application Priority Data

Jun. 2, 1989 [JP] Japan .................. 1-141316

[51] Int. Cl.$^5$ .......................... G01S 13/44; G01S 13/68
[52] U.S. Cl. .................... 342/149; 342/148; 342/453
[58] Field of Search ............... 342/453, 13, 148, 149

[56] References Cited

U.S. PATENT DOCUMENTS

| | | | |
|---|---|---|---|
| 3,863,259 | 1/1975 | Boughnon et al. | 342/427 |
| 3,921,175 | 11/1975 | Hughes et al. | 342/432 |
| 3,936,829 | 2/1976 | Overbury . | |
| 3,943,518 | 3/1976 | Barton | 342/408 |
| 3,946,386 | 3/1976 | Overbury et al. | 342/402 |
| 4,012,740 | 3/1977 | Lenneper | 342/428 |
| 4,063,242 | 12/1977 | Overbury et al. | 342/374 |
| 4,067,014 | 1/1978 | Wheeler et al. . | |
| 4,090,197 | 5/1978 | Cantrell . | |
| 4,106,023 | 8/1978 | Baghdady . | |
| 4,119,969 | 10/1978 | Barton | 342/408 |
| 4,131,890 | 12/1978 | Outram . | |
| 4,146,894 | 3/1979 | Barton | 342/418 |
| 4,214,316 | 7/1980 | Lipsky | 455/141 |
| 4,236,159 | 11/1980 | Alpers | 342/378 |
| 4,366,483 | 12/1982 | Hagedon et al. | 343/875 X |
| 4,638,319 | 1/1987 | Chua | 342/417 |
| 4,642,642 | 2/1987 | Uurtamo | 342/174 |
| 4,656,480 | 4/1987 | Allezard et al. | 342/151 |
| 4,706,093 | 11/1987 | Groth, Jr. | 342/427 |
| 4,736,460 | 4/1988 | Rilling | 455/283 |
| 4,752,969 | 6/1988 | Rilling | 455/278 |
| 4,797,679 | 1/1989 | Cusdin et al. | 342/387 |
| 4,894,662 | 1/1990 | Counselman, III | 342/357 |

OTHER PUBLICATIONS

"Introduction To Radar Systems" Ed. 2, by Merrill I. Spoklnik, McGraw-Hill, pp. 174–175.

*Primary Examiner*—John B. Sotomayor
*Attorney, Agent, or Firm*—Lowe, Price, LeBlanc & Becker

[57] ABSTRACT

A direction finding method and system for locating the direction of a transmission source based on an electromagnetic wave which is transmitted from the transmission source and is received by an antenna means at a receiving end apparatus. The transmission source transmits an angle-modulated wave. Meanwhile, the receiving end apparatus receives the transmitted wave, converts into electrical signals a beat frequency signal which is caused by direct and reflected waves contained in the received wave, and time-averaging the electrical signals, thus minimizing a angle error due to a multipass interference.

12 Claims, 12 Drawing Sheets

METHOD AND SYSTEM FOR LOCATING DIRECTION OF TRANSMISSION SOURCE BASED ON WAVE THEREFROM

This application is a continuation of application Ser. No. 07/531,678, filed Jun. 1, 1990, now abandoned.

BACKGROUND OF THE INVENTION

1. Field of the Invention

This invention relates to a direction finding method and a direction finding system for locating the direction of a wave transmission source from a receiver. The invention also relates a transmitting apparatus and a receiving end apparatus for the direction finding method and system.

2. Description of the Related Art

Heretofore, when conducting communication between a transmission source on a moving body, such as an automobile, a ship or an airplane, and a fixed or moving receiver, and vice versa, it has occasionally been necessary to orient a directional antenna at the receiver in the direction of the transmission source to improve the receiving ability.

In navigation aiding systems in which an electromagnetic wave transmitted from a transmission source disposed at a fixed point on the land is received on a moving body such as an airplane or a ship to locate a cruising position and direction, it is a necessity to measure the direction of the transmission source with accuracy.

In that case, since the transmission source's direction from the receiver varies due to the movement of the transmission source or the receiver, it is necessary to measure the direction of the transmission source at the receiver just before or during communication.

FIG. 5 of the accompanying drawings shows one example of the conventional direction finding system. As shown in FIG. 5, a sending station 2 comprises a pilot signal transmitter 21 equipped with a pilot signal transmitter antenna 23, and an electromagnetic wave transmitter 32, as a communication link, equipped with a transmitter antenna 24. The pilot signal transmitter 21 includes an oscillator 29 and an amplifier 30. The wave transmitter 32 includes a signal input terminal 25, a modulator 26, an oscillator 27 and an amplifier 28.

On the other end, a receiving station 1 comprises direction-finding receiver antennas 12a, 12b, a directional finding receiver 11, an averaging circuit 18, a directional antenna driver 14, a directional antenna 15, a receiver 16 and a signal output terminal 17.

The two direction-finding receiver antennas 12a, 12b of FIG. 5 are arranged in a plane in which the direction of the sending station 2 varies with respect to the receiving station 1; this arrangement is to find out a single dimensional direction.

The receiving station 1 is designed in association with any monopulse method, i.e., an amplitude comparison monopulse method, a monopulse method using a dual-mode spiral antenna, an amplitude/phase comparison monopulse method or a phase comparison monopulse method.

With this system, the sending station 2 transmits a pilot signal 3 to the receiving station 1. The receiving station 1 receives a pilot signal 3 on the direction-finding receiver 11 via the direction-finding receiver antennas 12a, 12b.

Using an amplitude comparison monopulse method, a monopulse method using a dual-mode spiral antenna, an amplitude/phase comparison monopulse method or a phase comparison monopulse method, the direction-finding receiver 11 generates a direction information signal of the sending station 2 from the amplitude ratio and the phase difference of the pilot signal 3 between the two antennas. This signal is supplied to the directional antenna driver 14 via the averaging circuit 18.

The directional antenna driver 14 orients the directional antenna 15 toward the direction of the sending station 2 according to the direction information signal. Thus the directional antenna 15 receives a direct wave 47 from the transmission antennas 24 and transfers its signal from the receiver 16 to the signal output terminal 17.

Generally, the direction-finding receiving system should use an antenna which is large in beam width and hence is low in gain, in order to cover a relatively wide area. However, to improve the S/N ratio, it is necessary to reduce the pass band of the system. Further, it is desirable to simplify the pilot signal transmitter 21. For this purpose, it has hitherto been a common practice to use a non-modulated continuous wave for the pilot signal 3.

In this conventional direction finding system, an error in the direction information from the pilot signal 3 would easily come out due to the multipath interference which occurs in an electromagnetic wave propagation path between sending station 2 and the receiving station 1.

Namely, because a direct wave 37 from the pilot signal 3 and a reflected wave 31 from the ground surface 5 concurrently strike the direction-finding receiver antennas 12a, 12b, a multipath interference would occur.

For minimizing the multipath interference, it is known to time-average the received signals for a relatively long time, smooth the changes of interference with time, which changes are associated with the movement of the moving body, and utilize this average value as direction information.

In this prior method, however, since fluctuations in direction information are ruled over by the pattern of movement of the moving body, the multipath interference would be fixed if the moving body is stopped. Consequently, an error not varying with time would occur so that the result of averaging cannot be obtained.

In addition, to improve the S/N ratio with a reduced pass band of the direction-finding receiver, it is needed to provide a frequency-stable oscillator, thus increasing the cost of production. This is particularly a serious problem when the direction finding is adopted with microwave bands.

SUMMARY OF THE INVENTION

It is therefore an object of this invention to provide a direction finding method and system by which a angle error due to a multipath interference can be minimized to thereby obtain accurate direction information from a pilot signal.

According to a first aspect of the invention, there is provided a direction finding method for locating the direction of a transmission source based on an electromagnetic wave which is transmitted from the transmission source and is received by an antenna means at a receiver apparatus, the method including: at the transmission source, transmitting an angle modulation wave; and at the receiver apparatus, receiving the transmitted wave, converting a beat frequency signal, which is caused by direct and reflected waves contained in the received wave, into electrical signals, and time-averaging the electrical signals, whereby a angle error due to a multipath interference is minimized.

The wave transmitted from the transmission source may be received by at least two antennas at the receiving apparatus, where the direction of the transmission source can be located by using the amplitude comparison monopulse method. If the wave transmitted from the transmission source is received by a dual-mode spiral antenna at the receiving apparatus, the direction of the transmission source may be located by using the monopulse method. Further, when the wave transmitted from the transmission source is received by at least two antennas at the receiving apparatus, the direction of the transmission source may be located by using the amplitude/phase comparison monopulse method. Besides, when the wave transmitted from the transmission source is received by at least two antennas at the receiving apparatus, the direction of the transmission source may be located by using the phase comparison monopulse method.

In the foregoing methods, the angle modulation wave may be a communication wave. Preferably, a time average value of the electrical signals converted from the beat frequency signal should be 0.

Further, the antenna means may include at least two pairs of antennas crossed one another perpendicularly, whereby mutually perpendicular two-dimensional directions of said transmission source can be located.

According to a second aspect of the invention, there is provided a direction finding system for locating the direction of a transmission source based on an electromagnetic wave which is transmitted from the transmission source and is received by an antenna means at a receiving apparatus, the system including: a transmission source being capable of transmitting an angle modulation electromagnetic wave; the antenna means being disposed at the receiving apparatus for receiving the transmitted wave; a signal conversion means disposed at the receiving apparatus for converting into electrical signals a beat frequency signal which is caused by direct and reflected waves contained in the wave received by said antenna; and an averaging circuit for time-averaging the electrical signals, whereby a angle error due to a multipath interference is minimized based on an output from said averaging circuit.

The antenna means includes at least two antennas at the receiving apparatus, where the direction of the transmission source is located by using the amplitude comparison monopulse method. If the antenna means includes a dual-mode spiral antenna at the receiving apparatus, the direction of the transmission source may be located by using the monopulse method. Further, when the antenna means includes at least two antennas at the receiving apparatus, the direction of the transmission source may be located by using the amplitude/phase comparison monopulse method. Besides, when the antenna means includes at least two antennas at the receiving apparatus, said direction of said transmission source may be located by using the phase comparison monopulse method.

In the foregoing systems, the angle modulation wave may be a communication wave. Preferably, a time average value of the electrical signals converted from the beat frequency signal should be 0.

Further, the antenna means may include at least two pairs of antennas crossed one another perpendicularly, whereby mutually perpendicular two-dimensional directions of said transmission source can be located.

According to a third aspect of the invention, there is provided a transmission apparatus for use in a direction finding system for locating the direction of a transmission source, by using the monopulse method, based on an electromagnetic wave which is transmitted from the transmission source and is received by an antenna means at the receiving apparatus, wherein the apparatus is capable of transmitting an angle modulation wave.

According to fourth aspect of the invention, there is provided a receiving apparatus for receiving, through an antenna means, an electromagnetic wave transmitted from a transmission source and for locating the direction of the transmission source based on the received wave, said apparatus comprising: said antenna means being capable of receiving the transmitted wave; a signal conversion means for converting into electrical signals a beat frequency signal which is caused by direct and reflected waves contained in the received wave; and an averaging circuit for time-averaging the electrical signals.

The amplitude comparison monopulse method may be used as a direction finding system. Or said antenna means may be a dual-mode spiral antenna, where the monopulse method is used as a direction finding system.

Alternatively, the amplitude/phase comparison monopulse method may be used as a direction finding system. In another alternative form, the phase comparison monopulse method may be used as a direction finding system.

The angle modulation wave to be used in this invention may include all of frequency modulation waves or phase modulation waves, for example, a linear chirp modulation signal, a sine waveform chirp modulation signal or a triangular waveform chirp modulation signal.

Further, the phase of the pilot signal may be varied directly with respect to time by the phase modulation.

In addition, transmitting may be performed from a single transmission source to a plurality of receiving stations. Or transmitting may be conducted in a bidirectional system which includes both a sending station and a receiving station at each of two locations.

The electrical signal may be a voltage signal, for example.

The averaging circuit may be a low-pass filter, which may be a digital or analog filter.

In this invention, the direction finding system includes a method using a continuous wave as well as a pulse method.

In operation, the transmission source transmits an angle modulation wave, and the receiver antenna receives a direct wave and a reflected wave of the transmitted wave.

As a direct wave and a reflected wave are propagated along different paths of propagation, which are different in length from each other, the waves different in receiving time are received concurrently.

Since the wave at the transmission source is an angle modulation wave, the transmission frequency varies at every instant and, as a result, the direct wave and the reflected wave would produce interference to develop a beat.

At the receiver, a beat frequency signal due to the direct wave and the reflected wave is converted into electrical signals to time-average the electrical signals.

Since the wave is an angle modulation wave, the electrical signals converted from the beat frequency signal are represented as a function to time, and their time average value will be 0 or nearly 0 as time-averaged. Accordingly, a angle error due to the direct wave's interference with the reflected wave can be minimized.

Therefore, it is possible to obtain accurate direction information of the transmission source from the wave in which a angle error due to the multipath interference has been minimized by using the amplitude comparison monopulse method, the monopulse method using a dual-mode spiral antenna, the amplitude/phase comparison monopulse method, or the phase comparison monopulse method.

By arranging the two pairs of antennas at right angles to one another, it is possible to locate mutually perpendicular two-dimensional directions of the transmission source.

In this invention, a communication wave may be used as a pilot signal. In this case, since only a single kind of wave may be needed, it is possible to reduce the cost of equipments and communication.

The above and other advantages, features and additional objects of this invention will be manifest to those versed in the art upon making reference to the following detailed description and the accompanying drawings in which several preferred embodiments incorporating the principles of this invention are shown by way of illustrative example.

DETAILED DESCRIPTION

Figure 1:
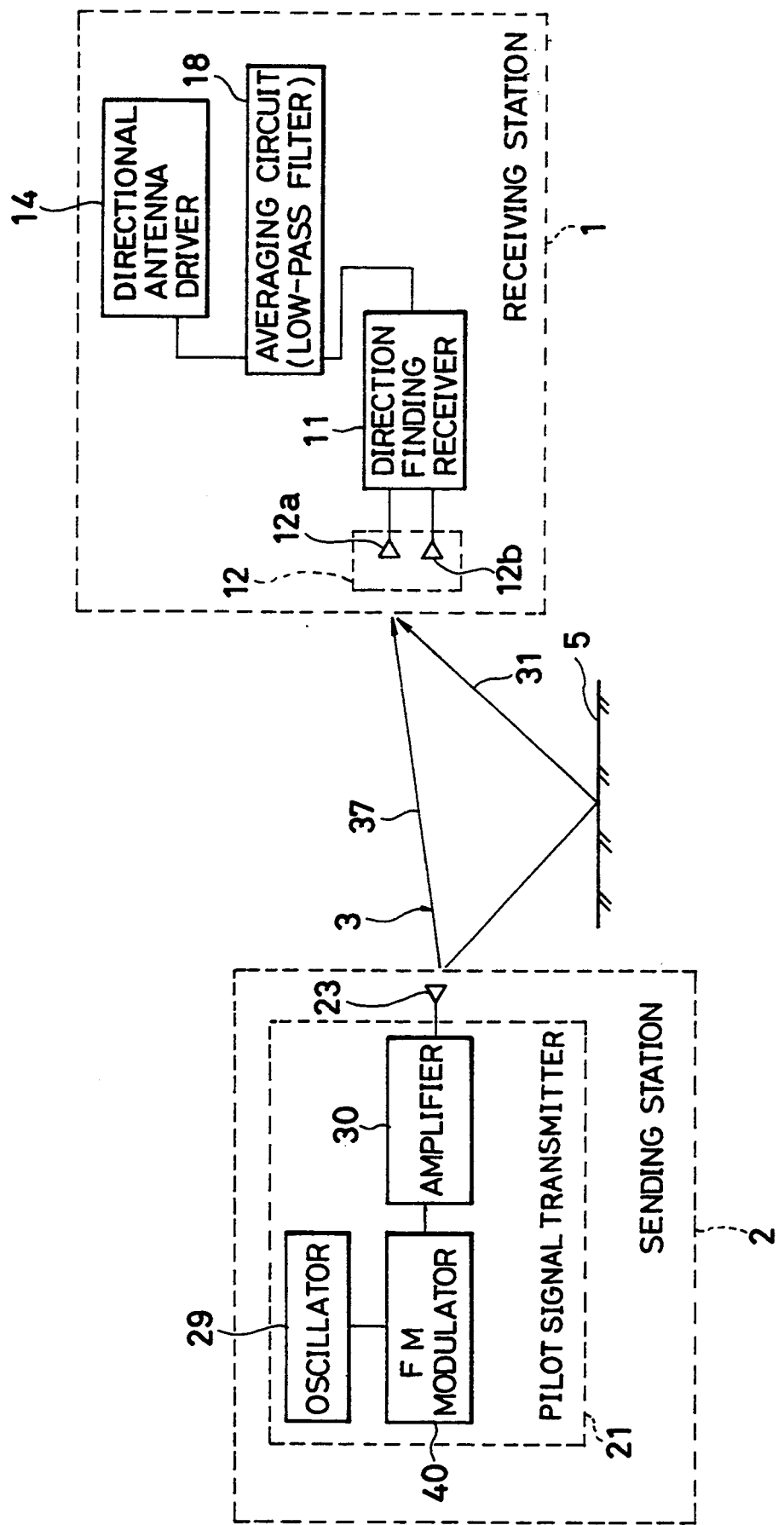
FIG. 1 is a block diagram of a direction finding system according to a first embodiment of this invention.

Various embodiments of this invention will now be described with reference to the accompanying drawings. Like reference numerals designate similar elements throughout several views; any overlapping of description of the individual elements is avoided here for clarity.

FIG. 1 shows a first embodiment of this invention, in which a sending station 2 is equipped with a pilot signal transmitter (hereinafter called "pilot signal transmitter") 21 having a pilot signal transmitter antenna 23. The pilot signal transmitter 21 is composed of an oscillator 29, an FM modulator 40 and an amplifier 30.

A receiving station 1 is composed of direction-finding receiver antennas 12a, 12b, a direction-finding receiver 11, an averaging circuit 18 and a directional antenna driver 14. The receiving station 1 is adapted for the one-dimension amplitude comparison monopulse method.

Figure 5:
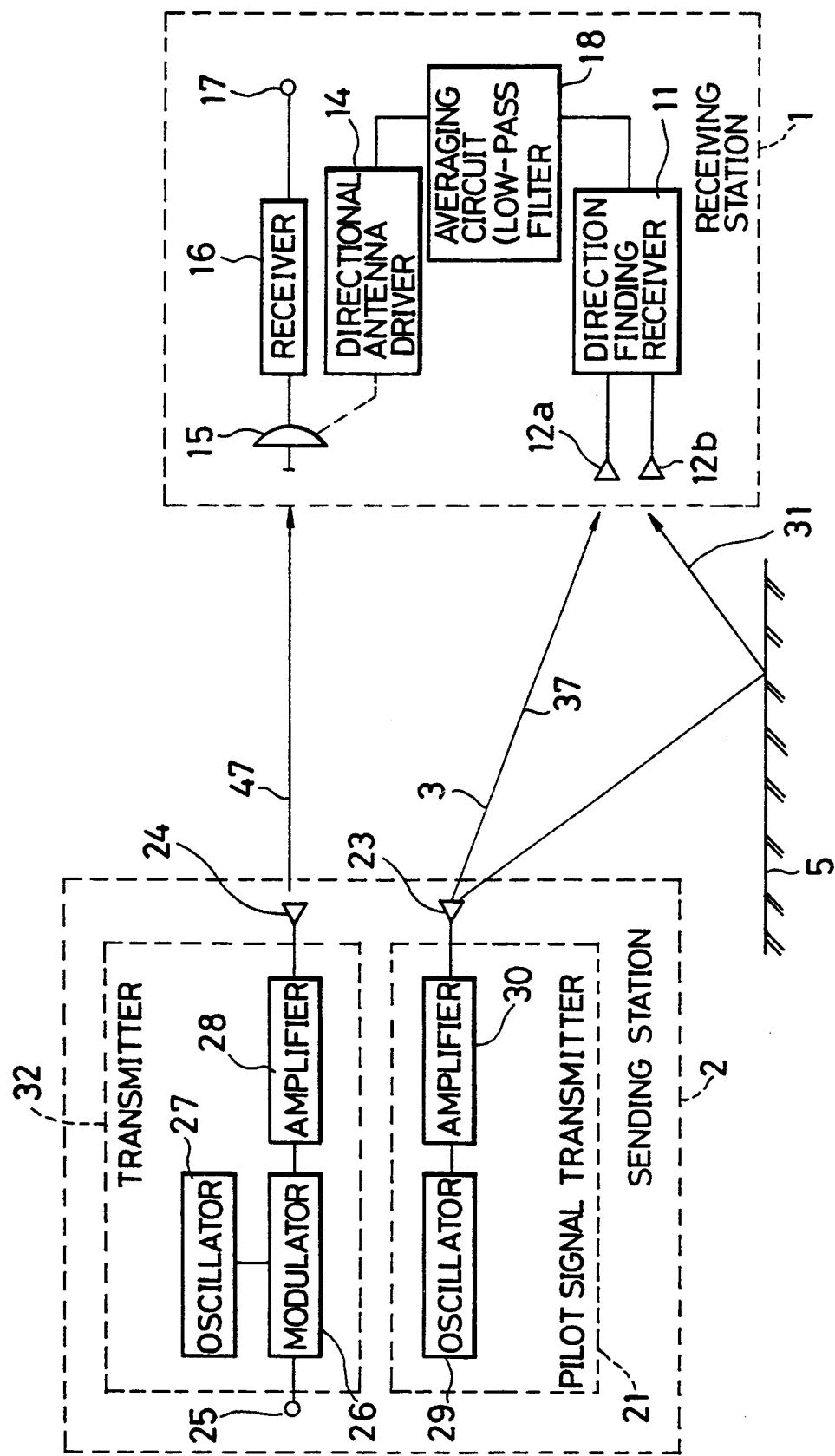
FIG. 5 is a block diagram showing a conventional direction finding system.

The direction-finding receiver antennas 12a, 12b also are matched with the one-dimension amplitude comparison monopulse method. The direction-finding receiver antennas 12a and 12b are disposed in a plane in which the direction of the sending station 2 varies with respect to the receiving station 1. Yet the direction-finding receiver 11 is adapted for the one-dimension amplitude comparison monopulse method. A low-pass filter is used for the averaging circuit 18. The directional antenna driver 14 controllably drives, for example, an antenna like the directional antenna of FIG. 5 so as to orient the antenna in a target direction. The directional antenna driver 14 may be a direction designating device as a host system using direction information.

For a pilot signal 3 to be transmitted from the pilot signal transmitter 21 via the pilot signal transmitter antenna 23, a chirp modulation wave such as a frequency modulation wave may be used.

Figure 6:
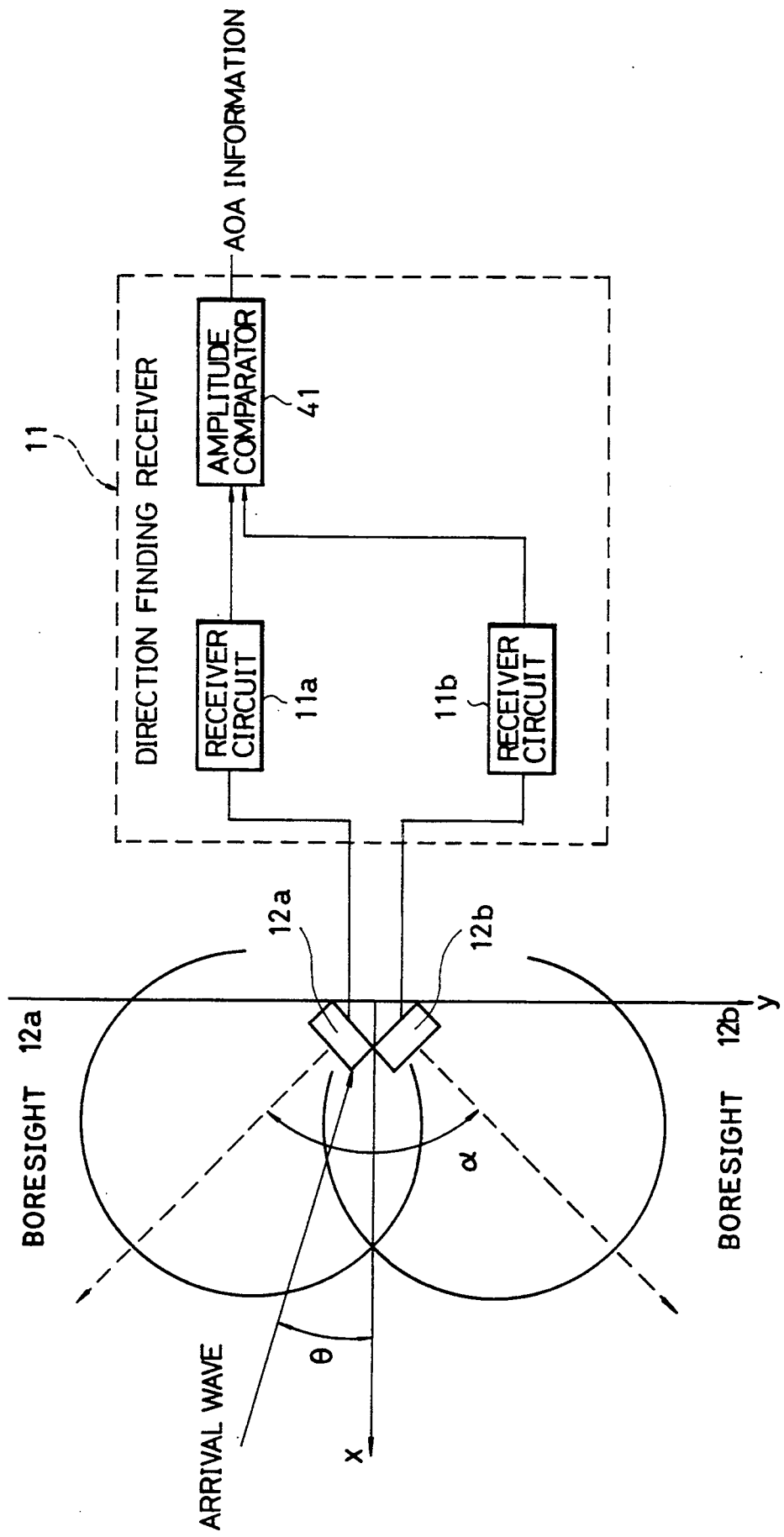
FIG. 6 is a diagram illustrating the principle of operation of the amplitude monopulse method.
Figure 7:
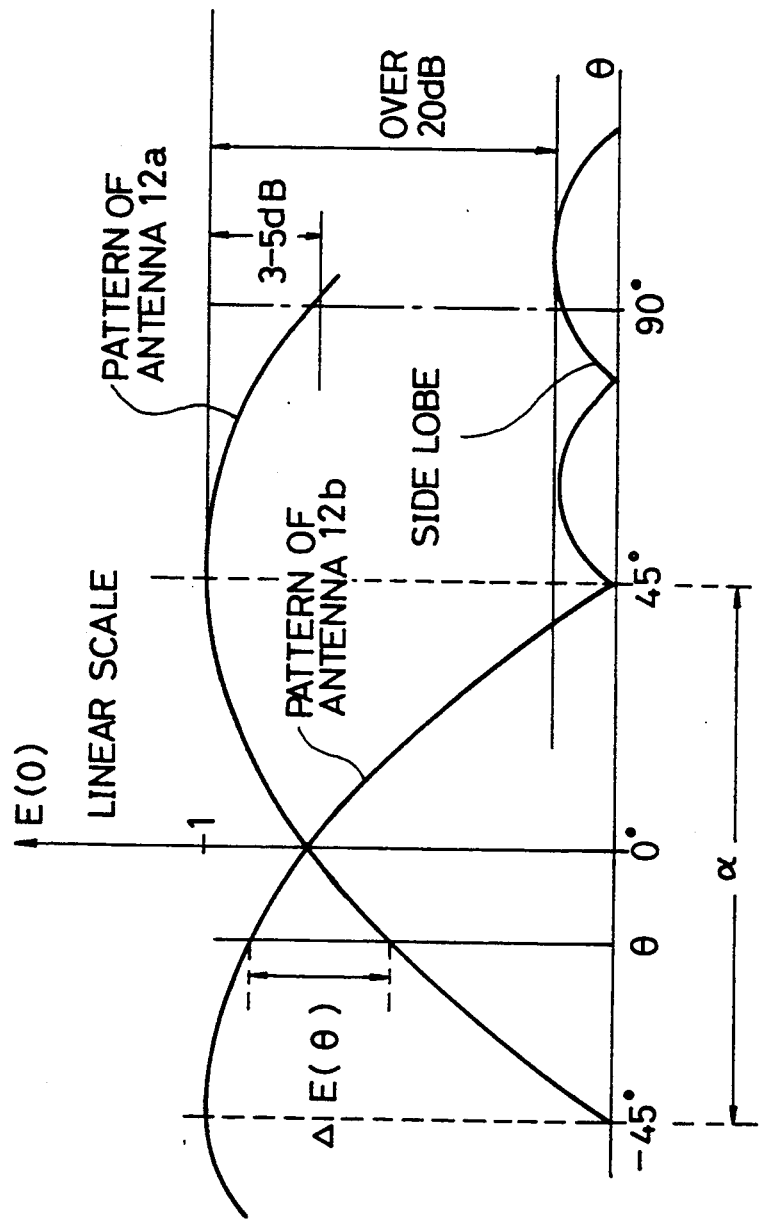
FIG. 7 is a graph diagram showing amplitude patterns.

FIG. 6 is a diagram showing the principle of operation of the amplitude monopulse method, and FIG. 7 is a graph showing an amplitude pattern.

In FIG. 6, the two direction-finding receiver antennas 12a, 12b are disposed at an angle $\alpha$ to each other's boresight and are connected to two receiver circuits (described below) 11a and 11b, respectively.

The receiver 11 is composed of two receiver circuits 11a, 11b and an amplitude comparator 41 for comparing their outputs; the output of the amplitude comparator 41 is then supplied to a host system where such output is used as direction information.

In use, the direction-finding receiver antennas 12a, 12b receive pilot signals. Upon receipt of the signals from the direction-finding receiver antennas 12a, 12b, the individual receiver circuits 11a, 11b perform conversion of frequency, amplification, filtration, rectification, etc.

Then the amplitude comparator 41 generates a differential output amplitude of the two receiver circuits 11a, 11b and outputs AOA (Angle of Arrival) information.

The principle of the amplitude comparison monopulse method is described below.

As shown in FIG. 7, since the amplitude pattern of one receiver antenna 12a and that of the other receiver antenna 12b are angularly spaced apart by an angle $\alpha$, a differential output $\Delta E$ of the two receiver circuits 12a, 12b varies depending on the arrival direction $\Theta$ of the wave This output $\Delta E(\alpha)$ is a function peculiar to the apparatus or system; since the form of the function can be premeasured, it is possible to learn the angle $\Theta$, namely, the arrival direction.

The operation of this embodiment will now be described.

In FIG. 1, the sending station 2 transmits a pilot signal 3 to the receiving station 1. Since the pilot signal 3 is frequency-modulated by the FM modulator 40, its frequency varies at every moment.

The pilot signal 3 transmitted from the pilot signal transmitter antenna 23 generates the wave 37 and a reflected wave 31, which occurred as reflected on the ground surface 5 or other object in the space propagation path.

The direct wave 37 and the reflected wave 31 are received by the two direction-finding receiver antennas 12a, 12b of the receiving station 1.

Since the direct wave 37 and the reflected wave 31 trace different paths as they travel from the pilot signal transmitter antenna 23 to the direction-finding receiver antennas 12a, 12b, a difference is created in propagation time between the direct wave 37 and the reflected wave 31. For this reason, when these waves are received at the receiving station 1, two mutually interfering frequency modulation waves, i.e. the direct wave 37 and the reflected wave 31, are different in frequency from one another.

The operation of the embodiment of FIG. 1 will now be described where chirp modulation is used as the modulation type of the pilot signal 3.

Assuming that $f_0$ represents the frequency of an oscillated wave from the oscillator 29, c represents a constant, and f represents the frequency of a chirp modulation wave as a frequency modulation wave, the following equation will be established:

$$f = f_0 + c \cdot t$$

The differential frequency between the two mutually interfering waves, i.e. the direct wave 37 and the reflected wave 31, can be represented by $c \cdot \Delta t$, where $\Delta t$ stands for the differential propagation time between the direct wave 37 and the reflected wave 31.

Figure 4:
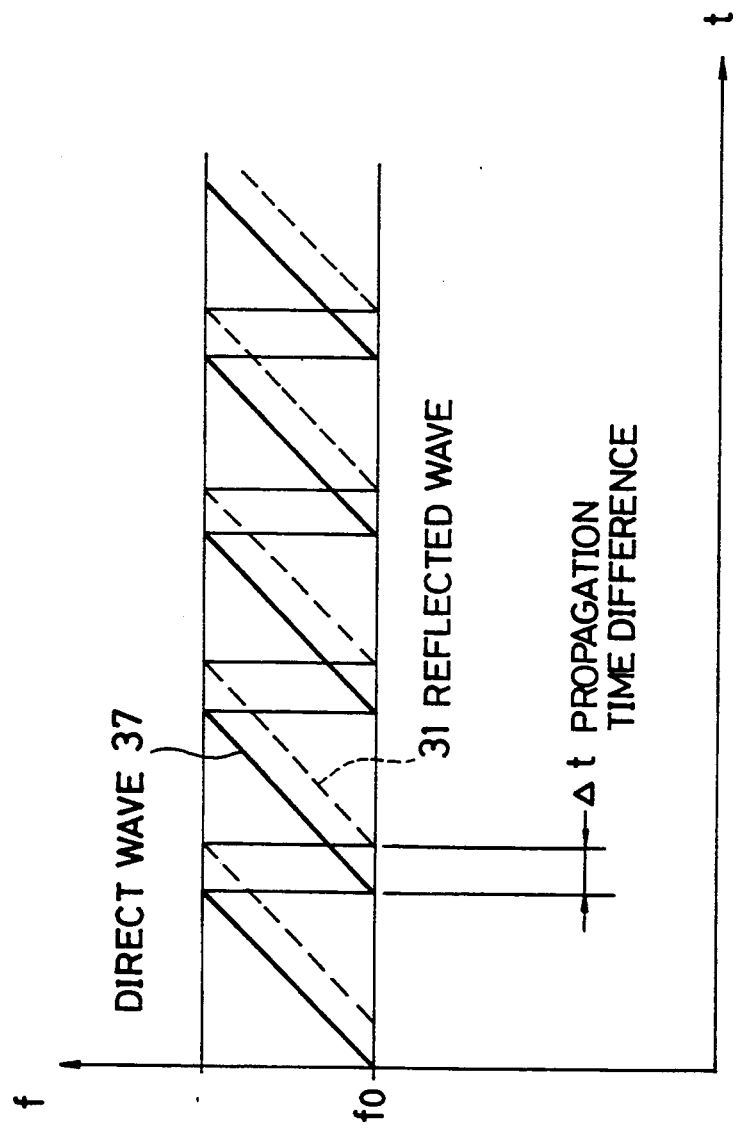
FIG. 4 is a diagram illustrating the multipath interference of a chirp modulation wave.

FIG. 4 shows the multipath interference of the chirp modulation wave, in which the differential propagation time between the direct wave 37 and the reflected wave 31 is represented by $\Delta t$. Generation of $\Delta t$ means that when two waves are received, a difference between their frequencies will be generated.

Assuming that $E_a$ represents the received signal of the direction-finding receiver antenna 12a, $E_b$ represents the received signal of the direction-finding receiver antenna 12b, $f_d$ represents the frequency of a direct wave, $f_r$ represents the frequency of a reflected wave, $K_a$ represents the amplitude of a reflected wave with respect to the direction-finding receiver antenna 12a, $\delta_a$ represents the phase of the reflected wave with respect to the same receiver antenna 12a, $K_b$ represents the amplitude of a reflected wave with respect to the direction-finding receiver antenna 12b, and $\delta_b$ represents the phase of the reflected wave with respect to the same receiver antenna 12b, the following equations will be established:

$$E_a = C_{sa}[\exp j(2\pi f_d \cdot t) + K_a \cdot \exp j(2\pi f_r t + \delta_a)] \quad (1)$$

$$E_b = C_{sb}[\exp j(2\pi f_d \cdot t) + K_b \cdot \exp j(2\pi f_r t + \delta_b)] \quad (2)$$

In each of these two equations, the first term represents the direct wave while the second term represents the reflected wave. Each of $C_{sa}$ and $C_{sb}$ represents a system constant (complex number) which is a value not varying with time and determined by transmission power, gain of each antenna, directional pattern of each antenna, and distance between the sending station and the receiving station. In general, it is well known that both $K_a$ and $K_b$ are smaller than unity.

In the meantime, if $\Delta t$ represents the differential propagation time of the direct wave and the reflected wave, the following equation will be established: $f_r = f_d + c \cdot \Delta t$.

Assuming that the position and antenna direction between the sending station and receiving station are fixed, the signal S representing direction information will be expressed by the following equation:

$$S = \left| \frac{E_b}{E_a} \right| \quad (3)$$

Substituting the equations (1) and (2) into the equation (3) yields:

$$S = \left| \frac{C_{sb}[1 + K_b \cdot \exp j\{2\pi(f_r - f_d)t + \delta_b\}]}{C_{sa}[1 + K_a \cdot \exp j\{2\pi(f_r - f_d)t + \delta_a\}]} \right| \quad (4)$$

Assuming that there exists no reflected wave, $K_a = K_b = 0$. Therefore, $$S = \left| \frac{C_{sb}}{C_{sa}} \right| \quad (5)$$

This equation (5) shows an ideal state devoid of any reflected wave.

To the contrary, in the presence of a reflected wave, since $K_a$ and $K_b$ vary in value and hence $E_a$ and $E_b$ vary in value, the value of S varies to cause an error.

If the direct wave and the reflected wave are equal in frequency, namely, $f_d = f_r$, $$S = \left| \frac{C_{sb}(1 + K_b \cdot \exp j\delta_b)}{C_{sa}(1 + K_a \cdot \exp j\delta_a)} \right| \quad (6)$$

By comparing this equation (6) with the equation (5), it is noted that the signal S contains error components, $K_a \cdot \exp j\delta_a$ and $K_b \cdot \exp j\delta_b$. Besides, since these error components should be regarded as a fixed error and are not a function of time in the absence of movement of either the sending station or the receiving station, this error cannot be minimized even by using an averaging circuit.

In this embodiment, however, a chirp modulation wave as a frequency modulation wave is used for the pilot signal 3. For this reason, when they are received by the receiving station, the direct wave and the reflected wave are different in frequency and, as seen from the equation (4), a beat frequency signal, $K_a \cdot \exp j\{2\pi(f_r - f_d)t + \delta_a\}$ and $K_b \cdot \exp j\{2\pi(f_r - f_d)t + \delta_b\}$ is caused to develop as an error. This beat frequency signal has a beat frequency $f_r - f_d$ and a period $1/(f_r - f_d)$ and hence can be obtained as a function of time.

The time average value of the error components of the equation (4), i.e., the beat frequency signal $K_a \cdot \exp j\{2\pi(f_r - f_d)t + \delta_a\}$ and $K_b \cdot \exp j\{2\pi(f_r - f_d)t + \delta_b\}$ will be zero.

For the practical time-averaging process, the beat frequency signal due to the direct wave and the reflected wave is converted into voltage signals, and then the voltage signals are time-averaged.

As a result of the time-averaging the beat frequency signal in the equation (4), the signal $\bar{S}$ representing direction information is expressed by the following equation:

$$\overline{S} = \left| \frac{C_{sb}}{C_{sa}} \right| \quad (7)$$

This equation (7) coincides with the equation (5). That is, the signal $\overline{S}$ is not subject to any influence of the reflected wave.

Therefore it is possible to reduce the angle error due to the multipath interference and to thereby obtain accurate direction information from the received signal.

In this embodiment, since the amplitude comparison monopulse method is used as a direction finding system, only amplitude is used as direction information.

The case in which the two-dimensional amplitude monopulse method is used as a direction finding system will now be described with reference to FIG. 8.

Figure 8:
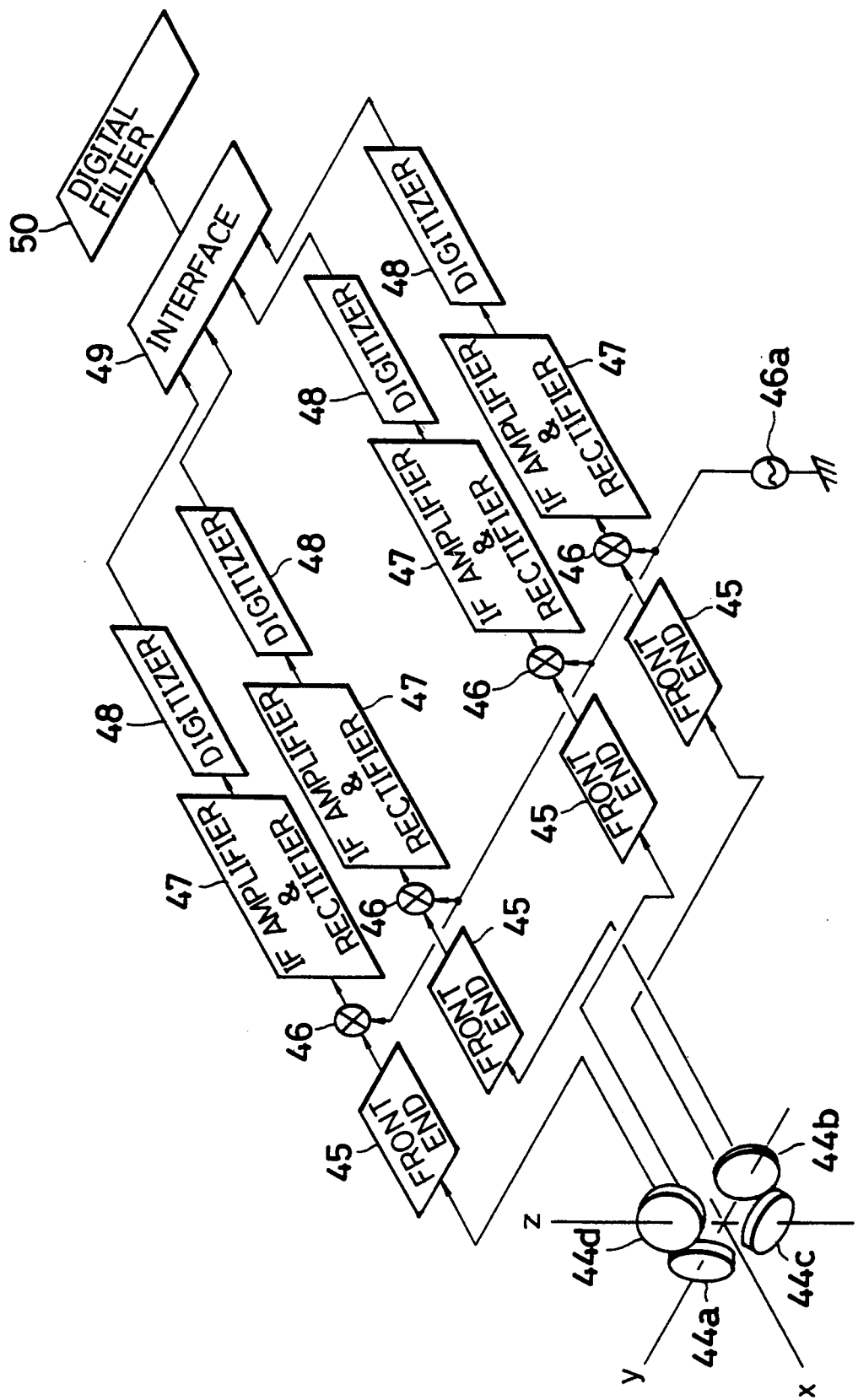
FIG. 8 is a block diagram showing a two-dimensional amplitude monopulse method into which this invention is incorporated.

In the two-dimensional amplitude monopulse method, as shown in FIG. 8, four spiral antennas 44 are respectively connected to four front ends 45. These front ends 45 are respectively connected to four mixers 46 each connected to an IF amplifier-and-rectifier set 47. The four IF amplifier-and-rectifier sets 47 are respectively connected to four digitizers 48. All of the four digitizers 48 are connected to an interface 49 which is connected to a digital filter 50.

In operation, four spiral antennas are capable of receiving an electromagnetic wave in two-dimensional directions. Each of the front ends 45 performs amplification and frequency selection. Each of the mixers 46 performs frequency conversion by using an oscillatory output from a local oscillator 46a. Each of the IF amplifier-and-rectifier sets 47 performs amplification and rectification after frequency conversion. Each of the digitizers 48 converts an analog signal into a digital signal. The interface 49 serves to adjust the output signal of the digitizers 48 with input conditions of the digital filter 50. The digital filter 50 time-averages a beat frequency signal.

In FIG. 8, angle information in a horizontal plane can be obtained from the output amplitude ratio of the spiral antennas 44a, 44b, while angle information in a vertical plane can be obtained from the amplitude ratio of the spiral antennas 44c, 44d. The process of generating each angle information may employ the one-dimensional method so that a angle error due to multipath interference can be reduced. Accordingly, accurate two-dimensional direction information can be obtained from the received signal.

Figure 2:
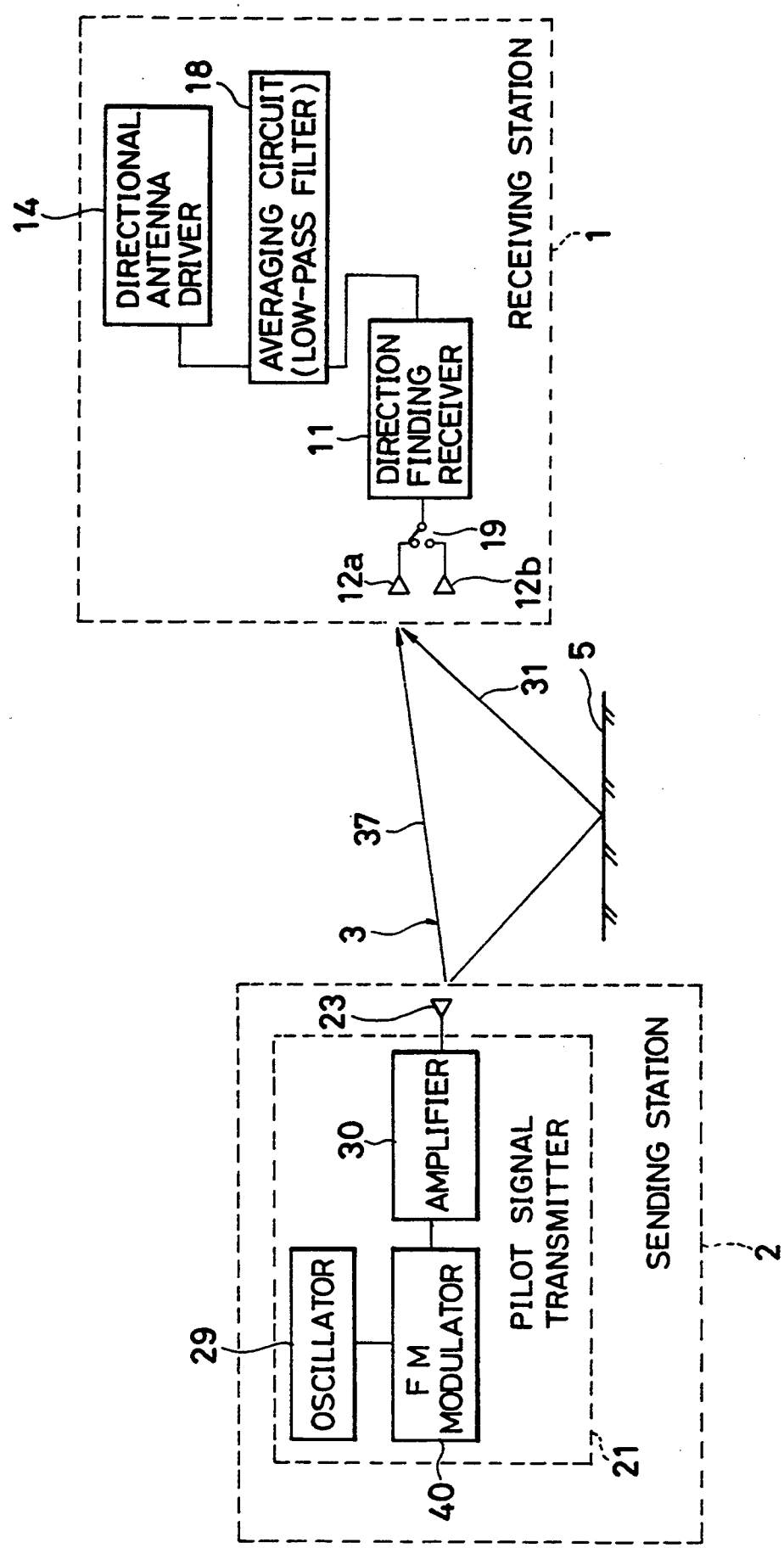
FIG. 2 is a block diagram similar to FIG. 1, showing another direction finding system according to a second embodiment.

FIG. 2 shows a second embodiment of this invention, in which the receiving station 1 is equipped with a change-over switch 19 disposed between the direction-finding receiver antennas 12a, 12b and the direction-finding receiver 11. As the direction-finding receiver antennas 12a, 12b are switched by this change-over switch 19, the amplitude of each antenna is measured. Thus, the direction finding system at the receiving station 1 is a pseudo amplitude comparison monopulse method.

The first embodiment is intended to average the signals S representing direction information. In the second embodiment, averaging is performed for each and every received signal $E_a$, $E_b$, whereupon operation of the signal S.

For the remaining points, the second embodiment is substantially identical in construction with the first embodiment.

As described above in connection with the first embodiment, the received signals $E_a$ and $E_b$ of the second embodiment are expressed by the following equations:

$$E_a = C_{sa}[\exp j(2\pi f_d \cdot t) + K_a \cdot \exp j(2\pi f_r \cdot t + \delta_a)] \quad (1)$$

$$E_b = C_{sb}[\exp j(2\pi f_d \cdot t) + K_b \cdot \exp j(2\pi f_r \cdot t + \delta_b)] \quad (2)$$

These equations (1) and (2) can be reexpressed as follows:

$$E_a = C_{sa} \cdot \exp j(2\pi f_d \cdot t) [1 + K_a \cdot \exp j\{2\pi (f_r - f_d) \cdot t + \delta_a\}] \quad (8)$$

$$E_b = C_{sb} \cdot \exp j(2\pi f_d \cdot t) [1 + K_b \cdot \exp j\{2\pi (f_r - f_d) \cdot t + \delta_b\}] \quad (9)$$

When these outputs are rectified, the rectified outputs $E_a{}^y$ and $E_b{}^y$ can be obtained as follows:

$$E_a{}^y \propto |C_{sa}[1 + K_a \cdot \exp j\{2\pi (f_r - f_d) \cdot t + \delta_a\}]| \quad (10)$$

$$E_b{}^y \propto |C_{sb}[1 + K_b \cdot \exp j\{2\pi (f_r - f_d) \cdot t + \delta_b\}]| \quad (11)$$

The time average value of the error components of the equations (10) and (11), i.e., the beat frequency signal $K_a \cdot \exp j\{2\pi (f_r - f_d)t + \delta_a\}$ and $K_b \cdot \exp j\{2\pi (f_r - f_d)t + \delta_b\}$ will be zero. Consequently, the equations (10) and (11) are reexpressed as follows:

$$E_a{}^y \propto |C_{sa}| \quad (12)$$

$$E_b{}^y \propto |C_{sb}| \quad (13)$$

Substituting these equations (12) and (13) into the equation (3) yields as follows:

$$S \propto \left| \frac{C_{sb}}{C_{sa}} \right| \quad (14)$$

The equation (14) is approximate to the equation (5) of the first embodiment.

Accordingly, like the first embodiment, the signal S representing direction information is free from any influence of a reflected wave.

Therefore it is possible to reduce the angle error due to the multipath interference and to thereby obtain accurate direction information from the received signal.

Figure 3:
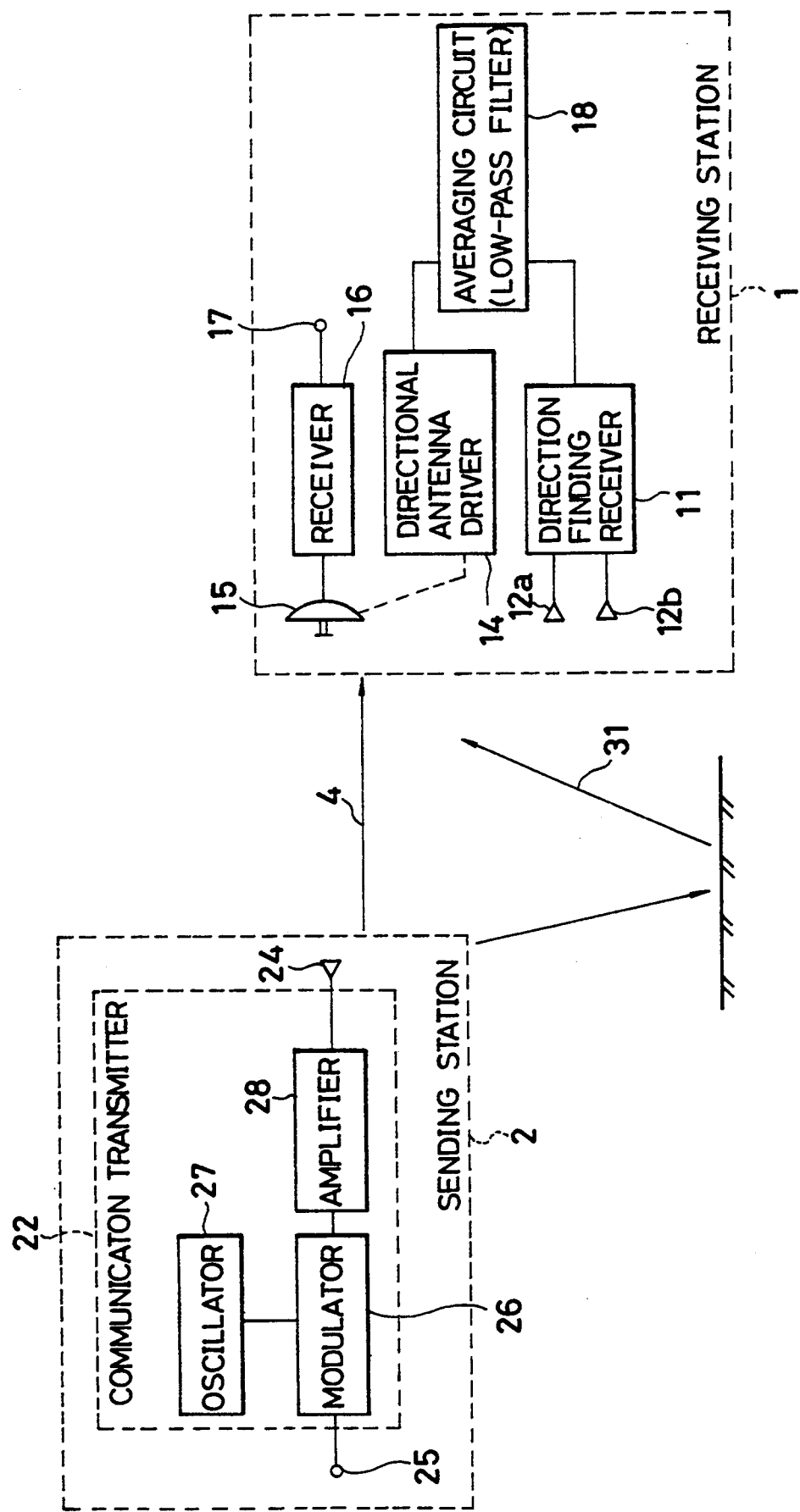
FIG. 3 is a block diagram showing still another direction finding system according to a third embodiment.

FIG. 3 shows a third embodiment, in which a transmission wave for communication is used as a pilot signal. In this case, the transmission wave is frequency-modulated or phase-modulated.

The sending station 2 is equipped with a transmitter 22 having a transmitter antenna 24. The sending station 2 is composed of an oscillator 27, a modulator 26 and an amplifier 28.

The receiving station 1 is composed of two direction-finding receiver antennas 12a, 12b, a direction-finding receiver 11, averaging circuit 18, a directional antenna driver 14, a directional antenna 15, a receiver 16 and a signal output terminal 17.

As driven by the directional antenna driver 14, the directional antenna 15 is directed toward the transmitter antenna 24 to receive a communication wave 4 from the transmitter antenna 24.

In this third embodiment, the construction of the sending station 2 is very simple and hence light in weight, so that the sending station 2 can be easily moved. In operation by battery, it is possible to increase the operating time by minimizing the coefficient of consumption of the battery.

A fourth embodiment will now be described, in which the receiving station 1 is similar in construction to the first embodiment, except for employing, instead of the one-dimensional amplitude comparison monopulse method, a monopulse method using a dual-mode spiral antenna.

Specifically, in FIG. 1, the receiving station is matched with the monopulse method using a dual-mode spiral antenna 12. Instead of the two direction-finding antennas 12a, 12b, this dual-mode spiral antenna 12 is used in this embodiment. The antenna 12 has two outputs called $\Sigma$ mode and $\Delta$ mode, and has two terminal for the respective modes. The direction-finding receiver 11 has two channels corresponding to the respective modes of the antenna 12.

The operation of the fourth embodiment will now be described in connection with the case in which like the first embodiment, chirp modulation is used in modulating the pilot signal 3.

On xyz coordinates, suppose that the direction-finding receiver antenna at the origin so as to match its boresight with the positive direction of z axis. At that time, the arrival direction of the wave can be expressed by $(\Theta, \phi)$ where $\Theta$ stands for the angle with respect to z axis in the yz plane and $\phi$ stands for the angle with respect to x axis in the xy plane.

Likewise, the direction in which the direct wave is incident on the direction-finding receiver antenna is expressed by $(\Theta_d, \phi_d)$, and the direction in which the reflected wave is incident on the same direction-finding receiver antenna is expressed by $(\Theta_r, \phi_r)$.

The ratio of the reflected wave to the incident wave on the direction-finding receiver antenna can be expressed by $K \cdot \exp j\delta$ where the amplitude and phase of the reflected wave to the direct wave stand for K (usually $|K| \leq 1$) and $\delta$, respectively.

Further, $\Sigma$ (sum signal) mode pattern and $\Delta$ (differential signal) mode pattern of the antenna are expressed by $G\Sigma(\Theta, \phi)$ and $G\Delta(\Theta, \phi)$, respectively. In addition, assuming that $f_d$ stands for the frequency of the direct wave, $f_r$ stands for the frequency of the reflected wave, t stands for time and $\Delta t$ stands for a differential propagation time, the following equation can be established: $f_r = f_d + c \cdot \Delta t$.

The output of the $\Sigma$ mode terminal can be expressed by the following equation:

$$E\Sigma = G\Sigma(\Theta_d, \phi_d) \cdot \exp j(2\pi f_d \cdot t) + G\Sigma(\Theta_r, \phi_r) \cdot K \cdot \exp j(2\pi f_r \cdot t) \quad (15)$$

The output of the $\Delta$ mode terminal can be expressed by the following equation:

$$E\Delta = G\Delta(\Theta_d, \phi_d) \cdot \exp j(2\pi f_d \cdot t) + G\Delta(\Theta_r, \phi_r) \cdot K \cdot \exp j(2\pi f_r \cdot t) \quad (16)$$

In these equations (15) and (16), the first term represents the direct wave, while the second term represents the reflected wave.

Further, the equations (15) and (16) can be reexpressed as follows:

$$E\Sigma = G\Sigma(\Theta_d, \phi_d) \cdot \exp j(2\pi f_d \cdot t) \quad (17)$$

$$\left[1 + \frac{G\Sigma(\Theta_r, \phi_r)}{G\Sigma(\Theta_d, \phi_d)} \cdot K \cdot \exp j\{2\pi(f_r - f_d) \cdot t + \delta\}\right]$$

$$E\Delta = G\Delta(\Theta_d, \phi_d) \cdot \exp j(2\pi f_d \cdot t) \quad (18)$$

$$\left[1 + \frac{G\Delta(\Theta_r, \phi_r)}{G\Delta(\Theta_d, \phi_d)} \cdot K \cdot \exp j\{2\pi(f_r - f_d) \cdot t + \delta\}\right]$$

The direction-finding signal S can be obtained by the following equation:

$$S = \frac{E\Delta}{E\Sigma} \quad (19)$$

Substituting the equations (17) and (18) into the equation (19) yields:

$$S = \frac{G\Delta(\Theta_d, \phi_d)}{G\Sigma(\Theta_d, \phi_d)} \cdot \frac{1 + K\Delta \cdot \exp j\{2\pi(f_r - f_d)t + \delta\}}{1 + K\Sigma \cdot \exp j\{2\pi(f_r - f_d)t + \delta\}} \quad (20)$$

where $$K\Sigma = \frac{G\Sigma(\Theta_r, \phi_r)}{G\Sigma(\Theta_d, \phi_d)} \cdot K, \text{ and } K\Delta = \frac{G\Delta(\Theta_r, \phi_r)}{G\Delta(\Theta_d, \phi_d)}$$

In the absence of any reflected wave, $K = 0$ and hence $K\Sigma = K\Delta = 0$. Consequently, the equation (20) is reexpressed as follows:

$$S = \frac{G\Delta(\Theta_d, \phi_d)}{G\Sigma(\Theta_d, \phi_d)} \quad (21)$$

When the direct wave and the reflected wave are equal to each other in frequency, $f_d = f_r$, the equation (20) is reexpressed as follows:

$$S = \frac{G\Delta(\Theta_d, \phi_d)}{G\Sigma(\Theta_d, \phi_d)} \cdot \frac{1 + K\Delta \cdot \exp j + \delta}{1 + K\Sigma \cdot \exp j + \delta} \quad (22)$$

By comparing the equation (22) with the equation (21), it is noted that the signal S contains error components, $K\Sigma \cdot \exp j \delta$ and $K\Delta \cdot \exp j \delta$. Besides, since these error components should be regarded as a fixed error and are not a function of time in the absence of movement of either the sending station or the receiving station, this error cannot be minimized even by using an averaging circuit.

In the fourth embodiment, however, a chirp modulation wave as a frequency modulation wave is used for the pilot signal 3. Therefore, when being received by the receiving station 1, the direct wave and the reflected wave are mutually different in frequency so that a beat frequency signal, i.e. $K\Sigma \cdot \exp j\{2\pi(f_r - f_d)t + \delta\}$ and $K\Delta \cdot \exp j\{2\pi(f_r - f_d)t + \delta\}$, is caused to develop as an error. This beat frequency signal has a beat frequency $f_r - f_d$ and a period $1/(f_r - f_d)$, and can be obtained as a function of time.

The time average value of the error components of the equation (20), i.e., the beat frequency signal $K\Sigma \cdot \exp j\{2\pi(f_r - f_d)t + \delta_a\}$ and $K\Delta \cdot \exp j\{2\pi(f_r - f_d)t + \delta_b\}$ will be zero.

For the practical time-averaging process, the beat frequency signal due to the direct wave and the reflected wave is converted into voltage signals, and then the voltage signals are time-averaged.

As a result of the time-averaging the beat frequency signal in the equation (20), the signal $\bar{S}$ representing direction information is expressed by the following equation:

$$\bar{S} = \frac{G\Delta(\Theta_d, \phi_d)}{G\Sigma(\Theta_d, \phi_d)} \quad (23)$$

This equation (23) coincides the equation (21). That is, the signal $\bar{S}$ is not subject to any influence of the reflected wave.

Therefore it is possible to reduce the angle error due to the multipath interference and to thereby obtain accurate direction information from the received signal.

Also in this embodiment, like the third embodiment, an electromagnetic wave for communication may be used as a pilot signal.

Figure 9:
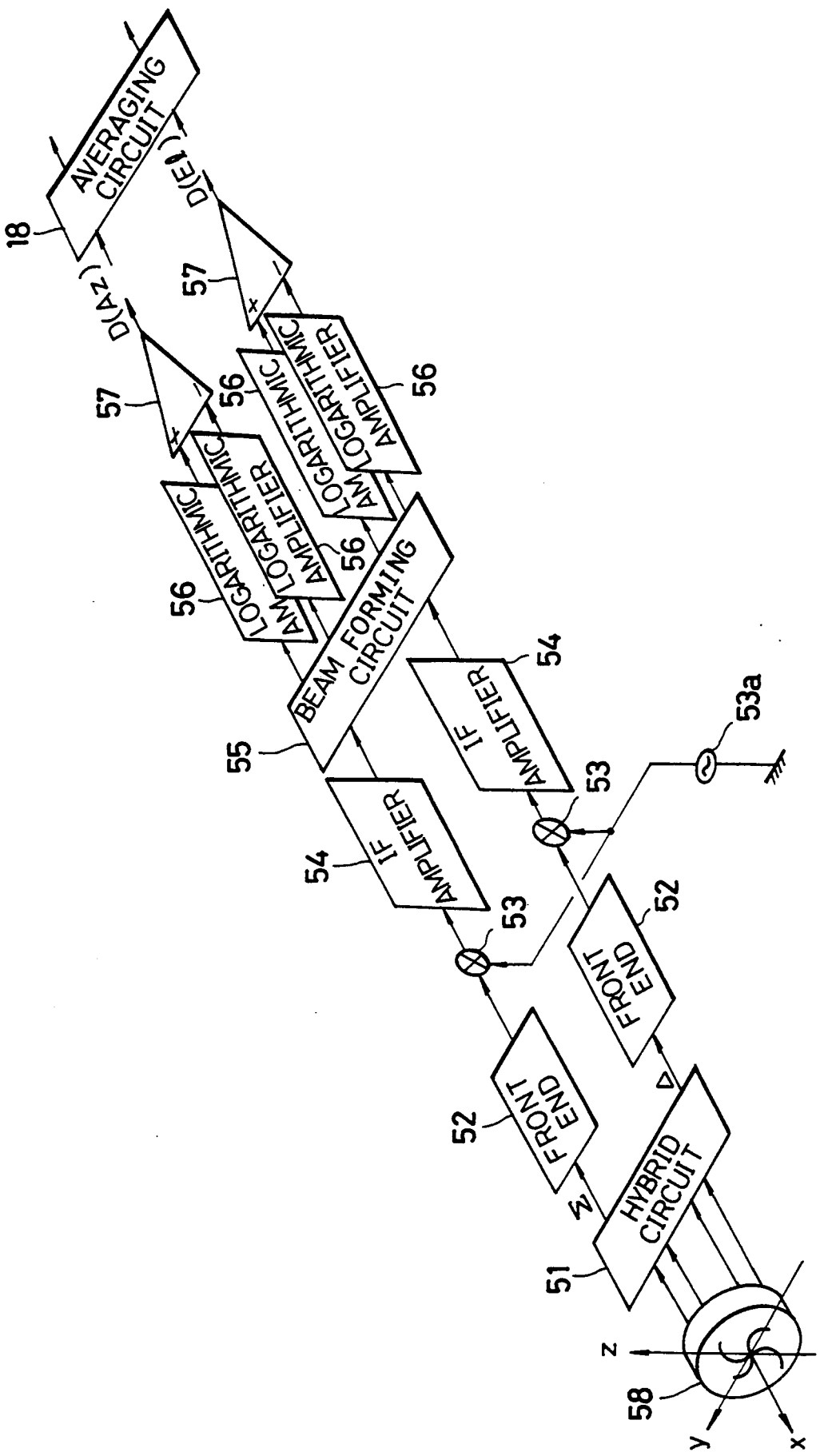
FIG. 9 is a block diagram showing a two-dimensional monopulse method using a four-arm spiral antenna into which method this invention is incorporated.

FIG. 9 shows the details of the monopulse method using a four-arm spiral antenna 58.

In the two-dimensional amplitude monopulse method, as shown in FIG. 9, individual components of four-arm spiral antenna 58 are connected to a hybrid circuit 51 connected to two front ends 52. These front ends 52 are respectively connected to two mixers 46 each connected to an IF amplifier 54. The two IF amplifiers 54 are connected to a beam forming circuit 55 which is connected to two pairs of logarithmic amplifiers 56. These two pairs of logarithmic amplifiers 56 are connected to a pair of adders 57 which is connected to the averaging circuit 18.

In operation, the four-arm spiral antenna 58 is capable of receiving an electromagnetic wave in two-dimensional directions. The hybrid circuit 51 separates the output of the four-arm spiral antennas 58 into $\Sigma$ mode and $\Delta$ mode. Each of the front ends 52 performs amplification and frequency selection. Each of the mixers 53 performs frequency conversion by using an oscillatory output from a local oscillator 53a. Each of the IF amplifiers 54 performs amplification after frequency conversion. The beam forming circuit 55 converts both the amplitude ratio and the differential phase of the $\Sigma$ mode and the $\Delta$ mode into amplitude information.

Each of the logarithmic amplifiers 56 performs logarithmic compression of a signal, and each adder 57 generates a differential output of the associated pair of logarithmic amplifiers 56. By the adder 57 and the associated logarithmic amplifiers 56, a quotient of the signals is calculated so that a suited pair of operations generates a D (Az) signal having angle information in a horizontal plane, and a D(El) signal having angle information in a vertical plane. The averaging circuit 18 time-averages beat frequency signals. Thus a angle error due to multipath interference is reduced so that two-dimensional direction information can be obtained from the received signal.

A fifth embodiment of this invention will now be described with reference to FIGS. 1 and 10.

The receiving station 1 of FIG. 1 is substantially similar in construction to that of the first embodiment, except using the one-dimension amplitude/phase comparison monopulse method instead of the one-dimension amplitude comparison monopulse method.

Specifically, the two direction-finding receiver antennas 12a, 12b are disposed in a plane in which the direction of the sending station 2 varies. Two direction-finding receivers 11a, 11b (FIG. 10) are matched with the one-dimension amplitude/phase comparison monopulse method.

Figure 10:
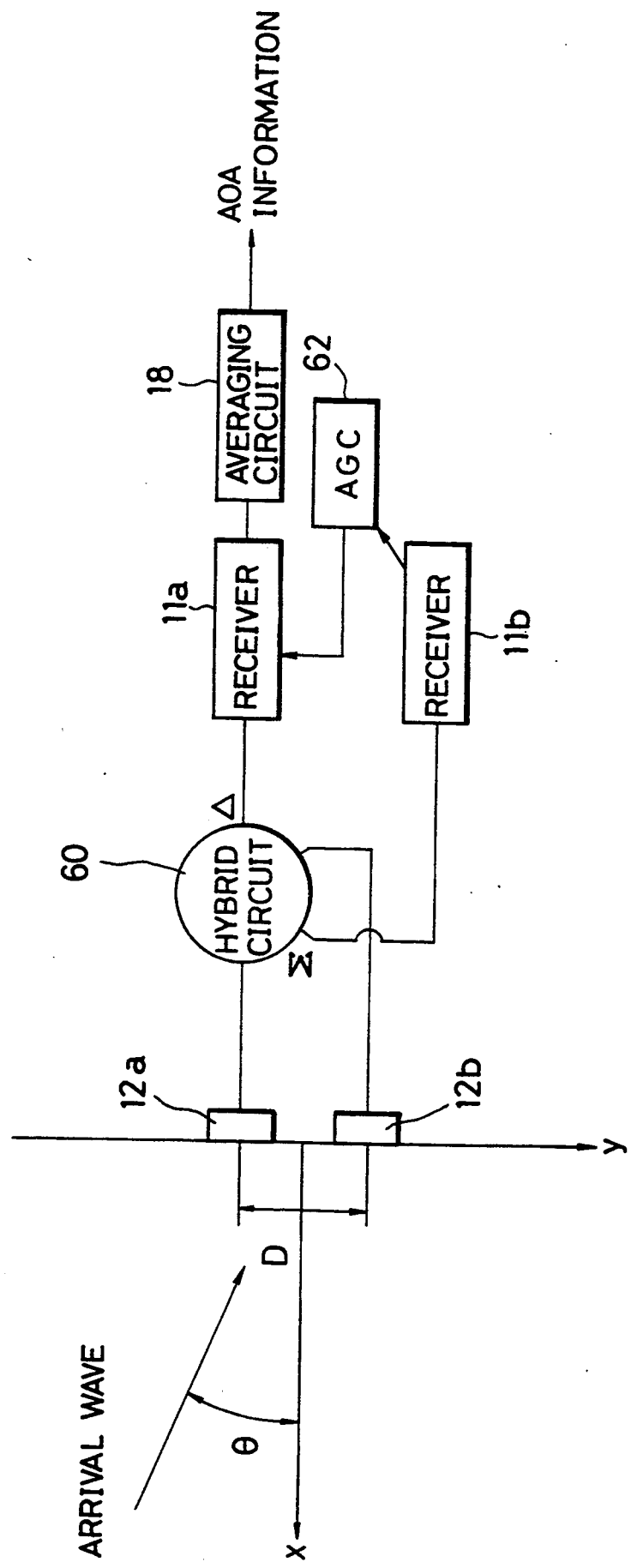
FIG. 10 is a block diagram showing an amplitude/phase monopulse method into which this invention is incorporated.

FIG. 10 shows the principle of the amplitude/phase monopulse method. In FIG. 10, the direction-finding receiver antennas 12a, 12b are disposed so as to have a common boresight.

The direction-finding receiver antennas 12a, 12b are connected to a hybrid circuit 60. The hybrid circuit 60 is connected to two receivers 11a, 11b, which are interconnected by an AGC (Automatic Gain Control) circuit 62. One receiver 11a associated with the direction-finding receiver antenna 12a is connected to the averaging circuit 18, while the other receiver 11b associated with the direction-finding receiver antenna 12b is connected to the input of the AGC circuit 62. The output of the AGC circuit 62 is connected to the one receiver 11a.

Each of the direction-finding receiver antennas 12a, 12b is capable of receiving a pilot signal.

Upon receipt of the respective signals from the direction-finding receiver antennas 12a, 12b, the hybrid circuit 60 generates a sum signal ($\Sigma$ mode) and a difference signal ($\Delta$ mode).

The receivers 11a, 11b receive the output $\Sigma$ of the $\Sigma$ mode terminal and the output $\Delta$ of the $\Delta$ mode terminal, respectively, and perform amplification, frequency selection, frequency conversion, rectification, etc.

The averaging circuit 18 is intended to time-average the beat frequency signals received from the receiver 11a, and the averaging circuit 18 associated with the direction-finding receiver antenna 12a outputs AOA information (angle information).

The AGC circuit 62 generates the ratio of the $\Delta$ mode to the $\Sigma$ mode.

The operation of the fifth embodiment will now be described in connection with the case in which chirp modulation is used for modulation of the pilot signal 3.

Assuming that $E_a$ represents the received signal of the direction-finding receiver antenna 12a, $E_b$ represents the received signal of the direction-finding receiver antenna 12b, $f_d$ represents the frequency of a direct wave, $f_r$ represents the frequency of a reflected wave, $K_a$ represents the amplitude of a reflected wave with respect to the direction-finding receiver antenna 12a, $\delta_a$ represents the phase of the reflected wave with respect to the same receiver antenna 12a, $K_b$ represents the amplitude of a reflected wave with respect to the direction-finding receiver antenna 12b, and $\delta_b$ represents the phase of the reflected wave with respect to the same receiver antenna 12b, the following equations like the first embodiment will be established:

$$E_a = C_{sa}[\exp j(2\pi f_d \cdot t) + K_a \cdot \exp j(2\pi f_r \cdot t + \delta_a)] \quad (1)$$

$$E_b = C_{sb}[\exp j(2\pi f_d \cdot t) + K_b \cdot \exp j(2\pi f_r \cdot t + \delta_b)] \quad (2)$$

In each of these two equations, like the first embodiment, the first term represents the direct wave while the second term represents the reflected wave. Each of $C_{sa}$ and $C_{sb}$ represents a system constant (complex number) which is a value not varying with time and determined by transmission power, gain of each antenna, directional pattern of each antenna, and distance between the sending station and the receiving station. In general, it is well known that both $K_a$ and $K_b$ are smaller than unity.

According to the amplitude/phase comparison monopulse method, a sum signal and a difference signal are generated from the outputs represented by the equations (1) and (2) by means of the hybrid circuit, and the direction is measured from the amplitude ratio and the differential phase of these signals.

In the meantime, if $\Delta t$ represents the differential propagation time of the direct wave and the reflected wave, the following equation will be established:

$$f_r = f_d + c \cdot \Delta t.$$

Assuming that the position and antenna direction between the sending station and receiving station are fixed, the signal S representing direction information will be expressed by the following equation:

$$S = \frac{E_a - E_b}{E_a + E_b} = \frac{1 - \frac{E_b}{E_a}}{1 + \frac{E_b}{E_a}} \quad (24)$$

Substituting the equations (1) and (2) into the equation (24) yields:

$$S = \frac{1 - \frac{C_{sb}[1 + K_b \cdot \exp j\{2\pi(f_r - f_d)t + \delta_b\}]}{C_{sa}[1 + K_a \cdot \exp j\{2\pi(f_r - f_d)t + \delta_a\}]}}{1 + \frac{C_{sb}[1 + K_b \cdot \exp j\{2\pi(f_r - f_d)t + \delta_b\}]}{C_{sa}[1 + K_a \cdot \exp j\{2\pi(f_r - f_d)t + \delta_a\}]}} \quad (25)$$

In the presence of a reflected wave, since $K_a$ and $K_b$ vary in value and hence $E_a$ and $E_b$ vary in value, the value of S varies to cause an error.

In the equation (25), assuming that there exists no reflected wave, $K_a = K_b = 0$.

Therefore, $$S = \frac{1 - \frac{C_{sb}}{C_{sa}}}{1 + \frac{C_{sb}}{C_{sa}}} \quad (26)$$

This equation (26) shows an ideal state devoid of any reflected wave.

If the direct wave and the reflected wave are equal in frequency, namely, $f_d = f_r$, $$S = \frac{1 - \frac{C_{sb}[1 + K_b \cdot \exp j\delta_b]}{C_{sa}[1 + K_a \cdot \exp j\delta_a]}}{1 + \frac{C_{sb}[1 + K_b \cdot \exp j\delta_b]}{C_{sa}[1 + K_a \cdot \exp j\delta_a]}} \quad (27)$$

By comparing this equation (27) with the equation (26), it is noted that the signal S contains error components, $K_a \cdot \exp j\delta_a$ and $K_b \cdot \exp j\delta_b$. Besides, since these error components should be regarded as a fixed error and are not a function of time in the absence of movement of either the sending station or the receiving station, this error cannot be minimized even by using an averaging circuit.

In this embodiment, however, a chirp modulation wave as a frequency modulation wave is used for the pilot signal 3. For this reason, when they are received by the receiving station, the direct wave and the reflected wave are different in frequency and, as seen from the equation (4), a beat frequency signal, $K_a \cdot \exp j\{2\pi(f_r - f_d)t + \delta_a\}$ and $K_b \cdot \exp j\{2\pi(f_r - f_d)t + \delta_b\}$ is caused to develop as an error. This beat frequency signal has a beat frequency $f_r - f_d$ and a period $1/(f_r - f_d)$ and hence can be obtained as a function of time.

The time average value of the error components of the equation (25), i.e., the beat frequency signal $K_a \cdot \exp j\{2\pi(f_r - f_d)t + \delta_a\}$ and $K_b \cdot \exp j\{2\pi(f_r - f_d)t + \delta_b\}$ will be zero.

For the practical time-averaging process, the beat frequency signal due to the direct wave and the reflected wave is converted into voltage signals, and then the voltage signals are time-averaged.

As a result of the time-averaging the beat frequency signal in the equation (25), the signal $\overline{S}$ representing direction information is expressed by the following equation:

$$\overline{S} = \frac{1 - \frac{C_{sb}}{C_{sa}}}{1 + \frac{C_{sb}}{C_{sa}}} \quad (28)$$

This equation (28) coincides with the equation (26). That is, the signal $\overline{S}$ is not subject to any influence of the reflected wave.

Therefore it is possible to reduce the angle error due to the multipath interference and to thereby obtain accurate direction information from the received signal.

In this embodiment, like the third embodiment, an electronic wave may be a frequency-modulated or phase-modulated wave.

The case in which the two-dimensional amplitude/phase monopulse method is used as a direction finding system will now be described with reference to FIG. 11.

Figure 11:
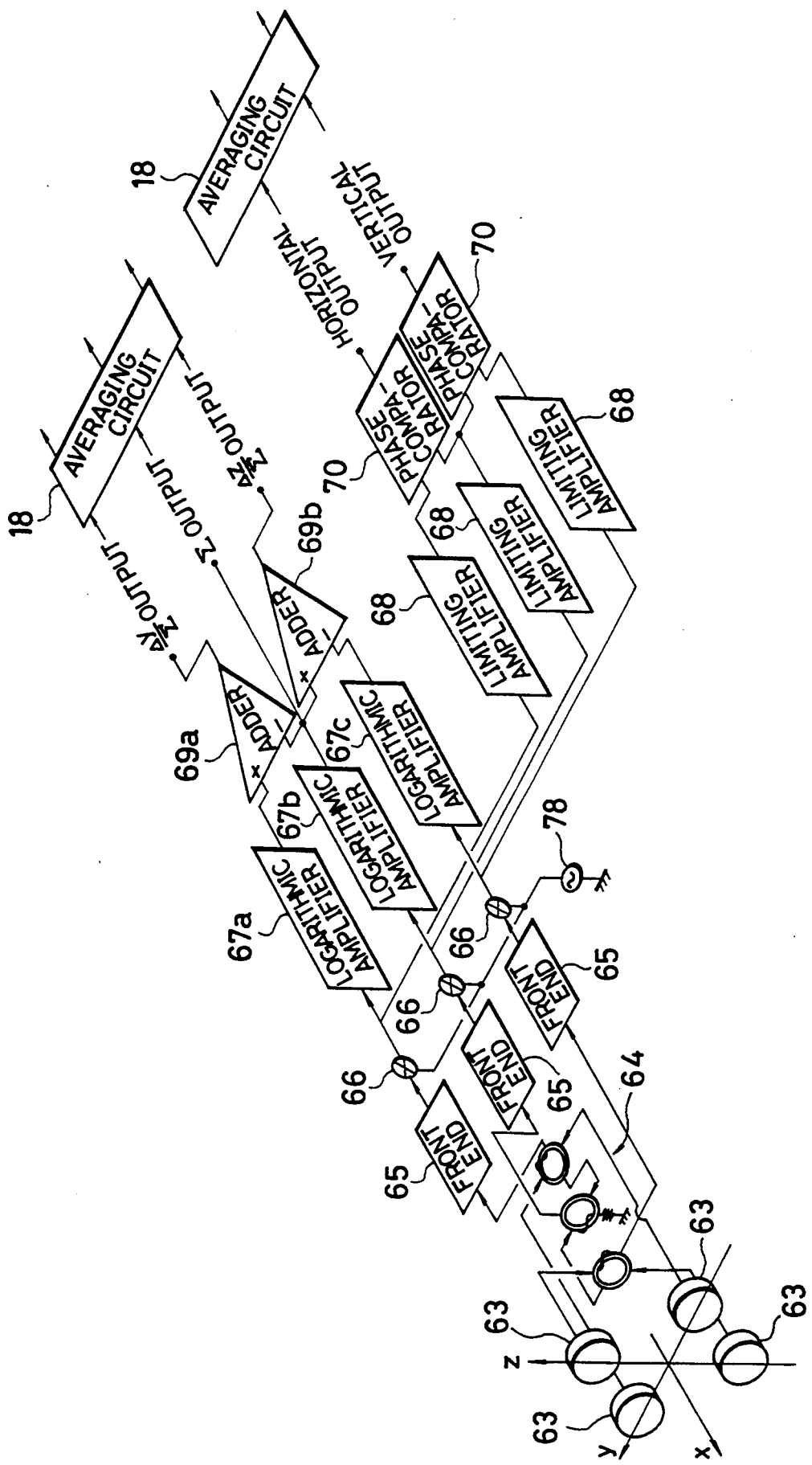
FIG. 11 is a block diagram showing a two-dimensional amplitude/phase monopulse method into which this invention is incorporated.

In the two-dimensional amplitude monopulse method, as shown in FIG. 11, four spiral antennas 63 are connected to a hybrid circuit system 64 composed of three monopulse comparators. The hybrid circuit system 64 is connected to three front ends 65. These front ends 65 are respectively connected to three mixers 66 all connected to a local oscillator 78. Each of the three mixers 66 is connected to a respective one of three logarithmic amplifiers 67a, 67b, 67c and also to a respective one of three limiting amplifiers 68. The three logarithmic amplifiers 67a, 67b, 67c are connected to two adders 69a, 69b, while the three limiting amplifiers 68 are connected two phase comparators 70. The averaging circuit 18 is connected to the adders 69a, 69b and the phase comparator 70.

The four direction-finding antennas 64 receive electromagnetic waves in two-dimensional directions. The hybrid circuit system 64 decomposes and composes the outputs of the four direction-finding antennas and generates a single sum output ($\Sigma$) and two difference outputs ($\Delta y, \Delta z$). Each of the front ends 65 performs amplification and frequency selection.

The outputs of the logarithmic amplifiers 67a, 67c are inputted to the inputs (+) of the adders 69a, 69b, respectively, while the output (−) of the logarithmic amplifier 67b is inputted to the inputs of the adders 69a, 69b and the input of the averaging circuit 18. These logarithmic amplifiers 67a, 67b, 67c perform logarithmic compression of the signals and perform with the adders 69a, 69b to calculate a quotient. This is another means for obtaining the ratio of two signals.

Each of the limiting amplifiers 68 amplifies signals to a constant amplitude.

The two adders 69a, 69b are capable of outputting two-dimensional direction information; one adder outputs ($\Delta y/\Sigma$) indicating an angle of an x-y plane, while the other outputs ($\Delta z/\Sigma$) indicating an angle of an x-z plane.

The two comparators 70 output a horizontal output and a vertical output, respectively, from the differential phase between $\Delta y$ and $\Delta z$ signals.

The averaging circuit 18 is capable of time-averaging beat frequency signals, performing the same function as those of the foregoing embodiments.

Thus it is possible to reduce the angle error due to the multipath interference and to thereby obtain accurate direction information from the received signal.

A sixth embodiment of this invention is described with reference to FIG. 1, in which the receiving station 1 is substantially similar in construction to that of the first embodiment, except using the one-dimension phase comparison monopulse method instead of the one-dimension amplitude comparison monopulse method.

Specifically, the two direction-finding receiver antennas 12a, 12b are disposed in a plane in which the direction of the sending station 2 varies. The direction-finding receiver 11 is adapted for the one-dimension phase comparison monopulse method.

The operation of the sixth embodiment is described, like the first embodiment, in connection with the case in which chirp modulation is used for modulation of the pilot signal 3.

Assuming that $E_a$ represents the received signal of the direction-finding receiver antenna 12a, $E_b$ represents the received signal of the direction-finding receiver antenna 12b, $f_d$ represents the frequency of a direct wave, $f_r$ represents the frequency of a reflected wave, $K_a$ represents the amplitude of a reflected wave with respect to the direction-finding receiver antenna 12a, $\delta_a$ represents the phase of the reflected wave with respect to the same receiver antenna 12a, $K_b$ represents the amplitude of a reflected wave with respect to the direction-finding receiver antenna 12b, and $\delta_b$ represents the phase of the reflected wave with respect to the same receiver antenna 12b, the following equations like the first embodiment will be established:

$$E_a = C_{sa}[\exp j(2\pi f_d t) + K_a \cdot \exp j(2\pi f_r t + \delta_a)] \quad (1)$$

$$E_b = C_{sb}[\exp j(2\pi f_d t) + K_b \cdot \exp j(2\pi f_r t + \delta_b)] \quad (2)$$

n each of these two equations, like the first embodiment, the first term represents the direct wave while the second term represents the reflected wave. Each of $C_{sa}$ and $C_{sb}$ represents a system constant (complex number) which is a value not varying with time and determined by transmission power, gain of each antenna, directional pattern of each antenna, and distance between the sending station and the receiving station. In general, it is well known that both $K_a$ and $K_b$ smaller than unity.

In the meantime, if $\Delta t$ represents the differential propagation time of the direct wave and the reflected wave, the following equation will be established: $f_r = f_d + c \cdot \Delta t$.

Assuming that the position and antenna direction between the sending station and receiving station are fixed, the signal S representing direction information will be expressed by the following equation:

$$S = \arg\left(\frac{E_b}{E_a}\right) \quad (29)$$

Substituting the equations (1) and (2) into the equation (29) yields:

$$S = \arg\left(\frac{C_{sb}[1 + K_b \cdot \exp j\{2\pi(f_r - f_d)t + \delta_b\}]}{C_{sa}[1 + K_a \cdot \exp j\{2\pi(f_r - f_d)t + \delta_a\}]}\right) \quad (30)$$

In the equation (30), assuming that there exists no reflected wave, $K_a = K_b = 0$.

$$S = \arg\left(\frac{C_{sb}}{C_{sa}}\right) \quad (31)$$

This equation (31) shows an ideal state devoid of any reflected wave.

To the contrary, in the presence of a reflected wave, since $K_a$ and $K_b$ vary in value and hence $E_a$ and $E_b$ vary in value, the value of S varies to cause an error.

If the direct wave and the reflected wave are equal in frequency, namely, $f_d = f_r$, $$S = \arg\left(\frac{C_{sb}[1 + K_b \cdot \exp j\delta_b]}{C_{sa}[1 + K_a \cdot \exp j\delta_a]}\right) \quad (32)$$

By comparing this equation (32) with the equation (31), it is noted that the signal S contains error components, $K_a \cdot \exp j\delta_a$ and $K_b \cdot \exp j\delta_b$. Besides, these error components should be regarded as a fixed error and are not a function of time in the absence of movement of either the sending station or the receiving station, this error cannot be minimized even by using an averaging circuit circuit.

In this embodiment, however, a chirp modulation wave as a frequency modulation wave is used for the pilot signal 3. For this reason, when they are received by the receiving station, the direct wave and the reflected wave are different in frequency and, as seen from the equation (30), a beat frequency signal, $K_a \cdot \exp j\{2\pi(f_r - f_d)t' \delta_a\}$ and $K_b \cdot \exp j\{2\pi(f_r - f_d)t' \delta_b\}$ is caused to develop as an error. This beat frequency signal has a beat frequency $f_r - f_d$ and a period $1/(f_r - f_d)$ and hence can be obtained as a function of time.

The time average value of the error components of the equation (30), i.e., the beat frequency signal $K_a \cdot \exp j\{2\pi(f_r - f_d)t' \delta_a\}$ and $K_b \cdot \exp j\{2\pi(f_r - f_d)t' \delta_b\}$ will be zero.

For the practical time-averaging process, the beat frequency signal due to the direct wave and the reflected wave is converted into voltage signals, and then the voltage signals are time-averaged.

As a result of the time-averaging the beat frequency signal $\overline{S}$ in the equation (30), the signal $\overline{S}$ representing direction information is expressed by the following equation:

$$\overline{S} = \arg\left(\frac{C_{sb}}{C_{sa}}\right) \quad (33)$$

This equation (33) coincides with the equation (31). That is, the signal $\overline{S}$ is not subject to any influence of the reflected wave.

Therefore it is possible to reduce the angle error due to the multipath interference and to thereby obtain accurate direction information from the received signal.

In this embodiment, like the third embodiment, an electronic wave may be a frequency-modulated or phase-modulated wave.

The case in which the two-dimensional phase monopulse method is used as a direction finding system will now be described with reference to FIG. 12.

Figure 12:
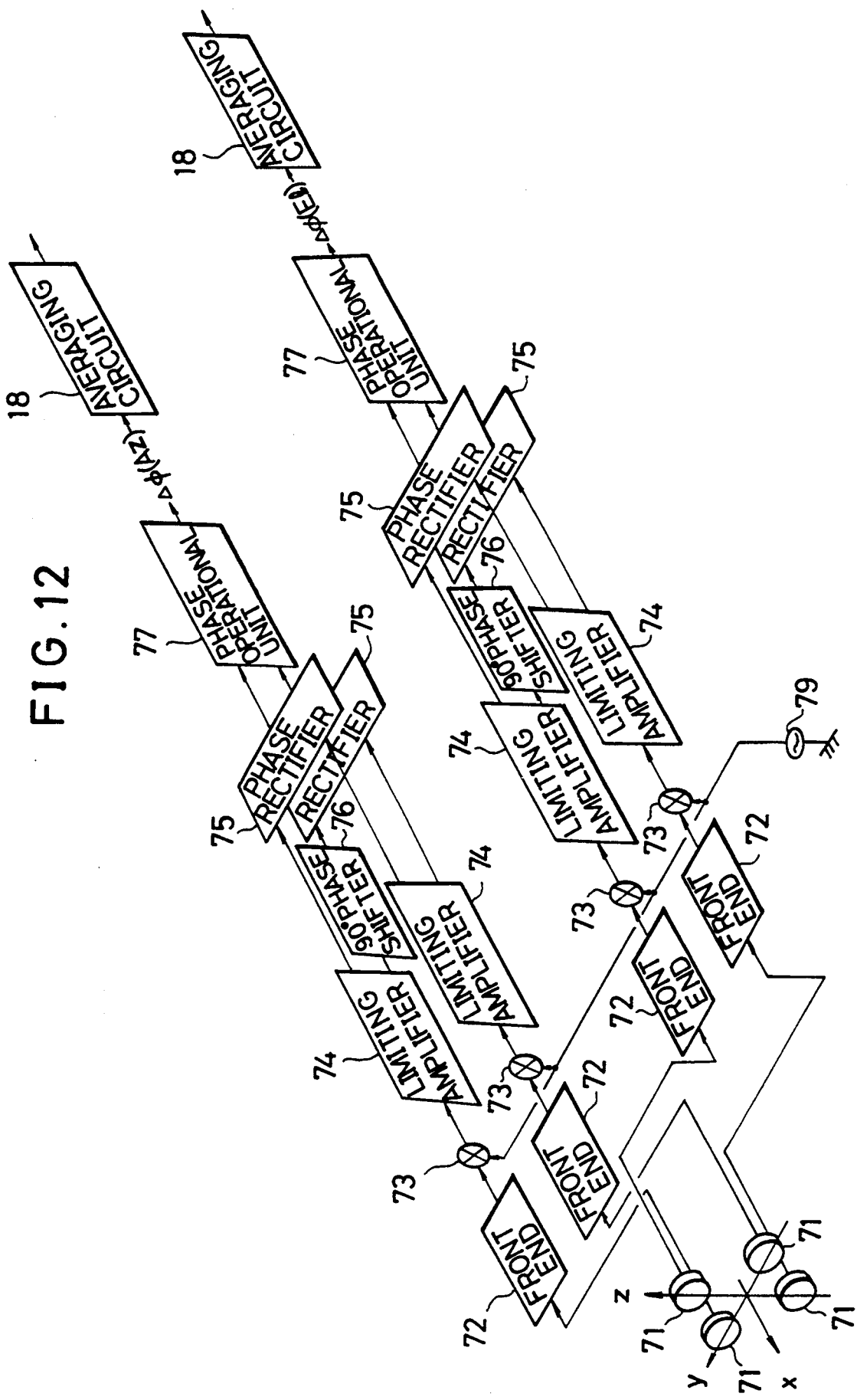
FIG. 12 is a block diagram showing a two-dimensional phase comparison monopulse method into which this invention is incorporated.

In the two-dimensional phase monopulse method, as shown in FIG. 12, four spiral antennas 71 are respectively connected to four front ends 72 which are respectively connected to four mixers 73 all connected to a local oscillator 79. Each of the four mixers 73 is connected to a respective one of four limiting amplifiers 74. Two of the limiting amplifiers 74 are respectively connected to two 90° phase shifters 76; the four limiting amplifiers 74 are respectively connected to four phase rectifiers 75. The four phase rectifiers 75 are connected to two phase operational units 77 which are respectively connected to two averaging circuits 18.

In the construction of FIG. 12, two sets of arrangements of FIG. 1 are used, and each pair of the antennas 20 crosses each other pair of the antennas perpendicularly thereto. Accordingly it is possible to obtain angle information in both an x-y plane and an x-z plane. In this case, like the foregoing other embodiment, by averaging by means of the averaging circuit 18, it is possible to minimize the angle error due to multipath interference so that accurate two-dimensional direction information can be obtained from the received signal.

In the foregoing embodiments, the frequency-modulated or phase-modulated wave may include every frequency modulation wave or every phase modulation wave. For example, the frequency-modulated or phase-modulated wave may include a straight chirp modulation signal as well as a sine waveform chirp modulation signal or a triangular waveform chirp modulation signal. The wave may also be one in which the phase of a pilot signal has been varied directly in terms of time by phase modulation.

In addition, transmitting may be performed from a single transmission source to a plurality of receiving stations. Or transmitting may be conducted in a bidirectional system which includes both a sending station and a receiving station at each of two locations.

It is preferable that the constant of a filter should be changeable automatically or manually.

According to this invention, the transmission source transmits an angle-modulated electromagnetic wave, while the receiving end receives a direct wave and a reflected wave of the transmitted wave, converts a beat frequency signal due to the direct and reflected waves into electrical signals and time-averages the electrical signals. Therefore it is possible to reduce a angle error due to multipath interference and to thereby obtain accurate direction information from a pilot signal.

Further, this invention can offer low cost of installation and communication when conducting one system of communication with one kind of electromagnetic wave.

What is claimed is:

1. A direction finding method for locating the direction of a transmission source based on an electromagnetic wave which is transmitted from the transmission source and is received by an antenna means at a receiving end apparatus, said method comprising:
   (a) at the transmission source, transmitting an angle-modulated wave which is a communication wave selected from a group consisting of a frequency modulated wave, a phase modulated wave, a chirp modulated wave, a frequency hopping wave, and a wave modulated by a phase shift keying; and
   (b) at the receiving end apparatus receiving the transmitted wave, converting a beat frequency signal formed from a combination consisting of a direct wave and a reflected wave contained in the received wave, into intermediate signals, and time-averaging the intermediate signals, whereby an angle error due to a multipath interference is minimized by substantially eliminating multipath signal components so that the direction of the transmission source can be determined by using a monopulse method at the receiving end apparatus,
   wherein a time averaged of the signals converted from the beat frequency signal is substantially 0 and modulation is unaltered by the direction of the transmission source with respect to the receiving end apparatus.

2. A direction finding method according to claim 1, in which the wave transmitted from the transmission source is received by at least two antennas at the receiving end apparatus, where the direction of the transmission source can be located by using the amplitude comparison monopulse method.

3. A direction finding method according to claim 1, in which the wave transmitted from the transmission source is received by a dual-mode spiral antenna at the receiving end apparatus, where the direction of the transmission source is located by using the monopulse method.

4. A direction finding method according to claim 1, in which the wave transmitted from the transmission source is received by at least two antennas at the receiving end apparatus, where the direction of the transmission source can be located by using the amplitude/phase comparison monopulse method.

5. A direction finding method according to claim 1, in which the wave transmitted from the transmission source is received by at least two antennas at the receiving end apparatus, where the direction of the transmission source is located by using the phase comparison monopulse method.

6. A direction finding system for locating the direction of a transmission source based on an electromagnetic wave which is transmitted from the transmission source and is received by an antenna means at a receiving end apparatus, said system comprising:
   (a) said transmission source including means for transmitting an angle-modulated electromagnetic wave which is a wave selected from a group consisting of a frequency modulated wave, a phase modulated communication wave, a chirp modulated wave, a frequency hopping wave, and a wave modulated by a phase shift keying, said angle-modulated electromagnetic wave being constituted to carry directional information and communication information;
   (b) said antenna means disposed at the receiving end apparatus for receiving the transmitted wave arranged so that the direction of the transmission source can be determined by using a monopulse method at the receiving end apparatus;
   (c) a signal conversion means disposed at the receiving end apparatus for converting into intermediate signals a beat frequency signal formed from a combination consisting of a direct wave and a reflected wave contained in the wave received by said antenna means; and (d) an averaging circuit for time-averaging the intermediate signals, whereby an angle error due to a multipath interference is minimized based on an output from said averaging circuit so as to substantially eliminate multipath signal components wherein a time averaged value of the signals converted from the beat frequency signal is substantially 0.

7. A direction finding system according to claim 6, in which said antenna means includes at least two antennas at the receiving end apparatus, where the direction of said transmission source is located by using the amplitude comparison monopulse method.

8. A direction finding system according to claim 6, in which the antenna means includes a dual-mode spiral antenna at the receiving end apparatus, where the direction of said transmission source is located by using the monopulse method.

9. A direction finding system according to claim 6, in which said antenna means includes at least two antenna at the receiving end apparatus, where the direction of said transmission source is located by using the amplitude/phase comparison monopulse method.

10. A direction finding system according to claim 6, in which said antenna means includes at least two antenna at the receiving end apparatus, where the direction of said transmission source is located by using the phase comparison monopulse method.

11. A direction finding system according to claim 1, in which said antenna means includes at least two pairs of antennas crossed one another perpendicularly, whereby mutually perpendicular two-dimensional directions of said transmission source can be located.

12. A direction finding system according to claim 6, in which said antenna means includes at least two pairs of antennas crossing one another perpendicularly, whereby mutually perpendicular two-dimensional directions of said transmission source can be located.

* * * * *